April 28, 1964     O. E. ROSAEN     3,131,145
FLUID FILTERING DEVICE
Filed March 12, 1962     2 Sheets-Sheet 1
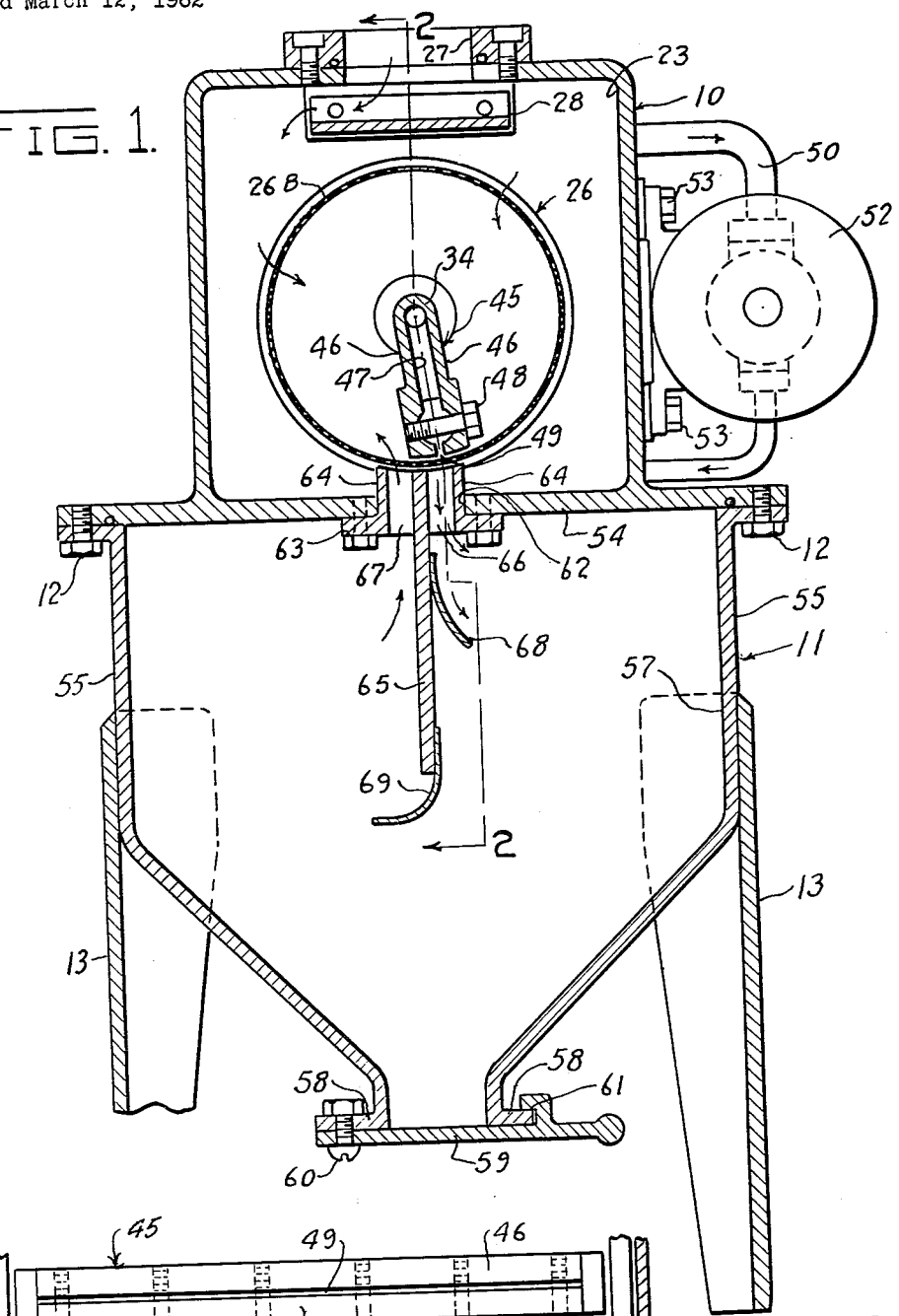
INVENTOR.
Oscar E. Rosaen
BY Hauke and Hauke
ATTORNEYS

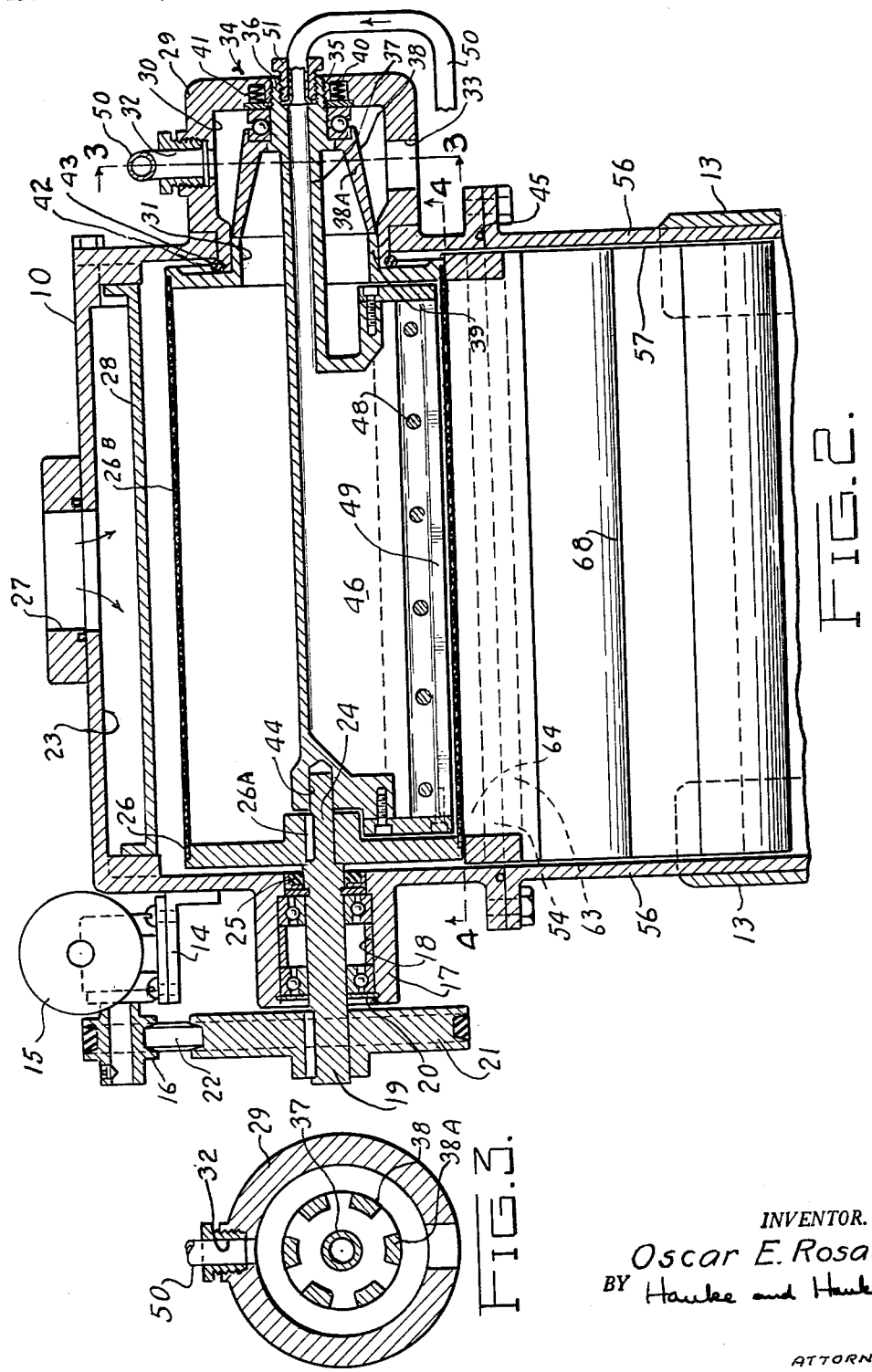

United States Patent Office 3,131,145
Patented Apr. 28, 1964

3,131,145
FLUID FILTERING DEVICE
Oscar E. Rosaen, Grosse Pointe, Mich., assignor to The Rosaen Filter Company, Hazel Park, Mich., a corporation of Michigan
Filed Mar. 12, 1962, Ser. No. 178,815
5 Claims. (Cl. 210—195)

This invention relates to fluid filters and more particularly to a filter having means for dislodging foreign matter tending to clog the filter and for collecting the foreign matter without interfering with the normal operation of the filtering device.

Filters which are used to eliminate foreign matter from fluid systems will sooner or later become clogged and removal and replacement will be necessary unless some means is provided for cleaning the filter while it still is operating.

My copending applications Serial No. 24,330, filed April 25, 1960, and now Patent No. 3,074,556, issued January 22, 1963, and Serial No. 56,826, filed Sept. 19, 1960, disclose means which provide for the removal of foreign matter from the filter without disrupting the operation of the machinery being served by the fluid system. While these filter devices have proved to be quite satisfactory, they offer the disadvantage that some of the fluid is used to carry off the foreign matter and this fluid is not returned to the fluid system but to the general fluid reservoir, resulting in a lessening of fluid flow and pressure through the filtering mechanism and also some difficulty in later separating the foreign matter from the general fluid supply.

It is an object of the present invention to improve filtering systems by providing means selectively operable to dislodge foreign matter from filters while the filter is in use and means collecting the foreign matter so dislodged.

It is a further object of the present invention to provide an improved means for removing foreign matter from a filter by providing means returning fluid used to clean the filter back to the fluid system in a filtered condition.

It is yet another object of the present invention to improve the operation of filter systems by providing means dislodging foreign matter from the filter and conducting it to a collecting chamber where it may be removed from the fluid system.

A still further object of the invention is to improve filter cleaning by providing a system operable to clean the filter during operation without effecting decrease in fluid flow or pressure.

Still further objects and advantages will be readily apparent to one skilled in the art upon reference to the following drawings in which like reference characters refer to like parts throughout the several views and in which:

FIG. 1 is a lateral cross sectional view of a preferred embodiment of the present invention.

FIG. 2 is a longitudinal cross sectional view taken substantially on line 2—2 of FIG. 1, FIG. 3 is a cross sectional view taken substantially on line 3—3 of FIG. 2, and FIG. 4 is a cross sectional view taken substantially on line 4—4 of FIG. 2.

The drawings illustrate a preferred filtering device as comprising a filter housing structure 10 and collector housing 11 secured to the filter housing 10 by any convenient means such as bolts 12. Supporting leg members 13 may be secured to the collector housing 11 as shown in FIG. 1.

As can best be seen in FIG. 2 a bracket 14 is secured to the exterior portion of the filter housing 10 and carries a motor 15 which is operable to drive a pulley 16. The filter housing 10 is provided with an exterior boss portion 17 having a cylindrical recess 18. A shaft 19 is rotatably carried in the boss portion 17 by bearings 20. A pulley 21 is keyed to the shaft 19 and is drivingly connected to the pulley 16 by a belt 22.

The filter housing 10 is provided with a filter chamber 23 into which an end portion 24 of the shaft 19 extends. A seal 25 is carried in the recess 18 and prevents leakage from the filter chamber 23 through the recess 18. A cylindrical filter assembly 26 is disposed within the filter chamber 23 and is keyed at one end as at 26A to the shaft 19. The assembly 26 carries a porous cylindrical filter screen 26B.

The cap member 29 closes the end of the filter housing 10 opposite the boss portion 17 and forms an outlet chamber 30 which communicates with the interior of the filter 26B through an opening 31 in the end of the filter 26B. Outlet ports 32 and 33 are provided in the cap member 29.

An elongated ejector member 34 has a threaded portion 35 engaging a threaded inlet opening 36 provided in the cap member 29 and is positioned to extend through the opening 31 into the interior of the filter 26. The ejector member 34 is provided with a hollow shaft portion 37 upon which is rotatably, axially slidably carried an inwardly extending spider member 38. The legs 38A of the spider member 38 are urged to engage an outwardly extending annular flange portion 39 of the filter 26 by a spring 40 which is carried in an annular recess 41 provided in the cap member 29. The cap member 29 is provided with an annular beveled shoulder 42 which cooperates with the end surface of the filter 26 to provide a seat for an O-ring seal 43.

The hollow shaft portion 37 of the ejector member 34 is supported and fixed at one end by the cap member 29 in the threaded inlet opening 36. The other end is provided with a recess 44 into which the end portion 24 of the shaft 19 extends. The end portion 24 fits within the recess 44 and retains the ejector member 34 from lateral displacement while still permitting the shaft 19 to rotate.

The hollow shaft 37 carries an elongated manifold element 45 which has a pair of substantially parallel side members 46 defining an outlet channel 47 which communicates with the interior of the hollow shaft 37. A plurality of equally spaced bolts 48 extend between the side members 46 and provide a means of setting the cross sectional width of an elongated ejector slot 49. The slot 49 communicates with the outlet channel 47 and is disposed closely adjacent the filter 26B.

A conduit 50 provides communication between the outlet 32 and an inlet plug 51 carried in the end of the hollow shaft 37. A pump 52 is disposed in the conduit 50 and is preferably secured to the filter housing 10 by bolts 53 as can best be seen in FIG. 1.

The collector housing 11 preferably comprises a wall 54 common with the filter housing 10, a pair of opposite side walls 56 defining a collector chamber 47. The lower portions of the side walls 55 and end walls 56 slope inwardly, terminating in a funnel shaped section having an outwardly bent flange portion 58. A cover plate 59 is removably carried on the flange portion 58 by a bolt 60 and a recess 61 complementary to the flange 58.

An elongated slot 62 is provided in the wall 54 and provides communication between the filter chamber 23 and the collector chamber 47. A flanged member 63 is secured to the wall 54 and has opposite sides 64 which extend into the filter chamber 23 to a point closely adjacent the filter 26B. A baffle member 65 is disposed in the slot 62 spaced from the sides 64 and defines an inlet 66 and an outlet 67. The baffle member 65 is provided with a pair of curved baffle plates 68—69 disposed in the collector chamber 47 as shown in FIG. 1.

The ejector member 34 is positioned in the filter chamber 23 so that the elongated slot 49 faces the inlet 66.

In operation fluid is conducted through the inlet 27 into the filter chamber 23. The baffle structure 28 tends to disperse the fluid so that it will encompass the filter 26B. The fluid passes to the interior of the filter assembly 26, through the opening 31, through the legs of the spider member 38, and through the outlet 33 to a user which is not shown.

When the filter 26 becomes clogged by foreign matter collecting on its outer surface, or at any desired periodic or intermittent times, the motor 15 is actuated. It is apparent that any automatic means may be provided to actuate the motor either periodically or upon sensing a pressure differential across the filter 26. The motor 15 rotates the shaft 19 which in turn rotates the filter assembly 26.

At the same time the pump 52 is actuated to conduct fluid from the outlet 32 through the conduit 50 and through the inlet plug 51 to be ejected from the slot 49 of the ejector member 34. Fluid thus is directed through a constantly changing portion of the filter 25 and foreign matter lodged on its outer surface is carried into the collector chamber 47 through the inlet 66. It will be noted that the force of the fluid to be ejected may be varied by varying the cross sectional area of the slot 49 by adjusting the bolts 48.

The collector chamber 57 is pressure sealed and preferably kept full of fluid so that ejection of fluid into it will force fluid to return to the filter chamber 23 under pressure by way of the outlet 67. The baffles 65, 68 and 69 are provided to induce the foreign matter to settle to the bottom of the collector chamber 57 before the fluid is returned to the fluid system. Fluid leaving the collector chamber 57 will again pass through the filter 26 and thus will re-enter the system in a filtered condition. The foreign matter which will settle to the bottom of the collector chamber 57 may be periodically removed by removing the cover 59.

It will be seen from the foregoing that I have provided a simple and effective means of dislodging and removing foreign matter clogging the filter without loss of fluid or pressure from the system.

Although I have described but one preferred embodiment of the present invention, it will be apparent to anyone skilled in the art to which the invention pertains that various changes and modifications may be made therein without departing from the spirit of the invention or the scope of the appended claims.

I claim:
1. A fluid filter device comprising
   (a) a filter housing and a collector housing connected by a common wall portion to form a closed filter chamber and a pressure sealed collecting chamber separated by said common wall portion,
   (b) a filter assembly comprising a cylindrical filter element and being rotatably carried in said filter chamber on an axis substantially parallel with the plane of said common wall portion,
   (c) said filter housing having an inlet opening to said filter chamber exteriorly of said filter element and an outlet opening to said filter chamber interiorly of said filter element,
   (d) means selectively operable to rotate said filter element,
   (e) an elongated ejector member carried in said filter housing and having a portion extending into the interior of said filter element,
   (f) said ejector member having a longitudinal slot disposed closely adjacent a portion of the inner wall of said filter element whereby as said filter element is rotated the portion of said filter element wall adjacent said slot is changed,
   (g) an elongated opening in said common wall portion closely adjacent and substantially parallel to said longitudinal slot,
   (h) means operable to forcibly conduct fluid from the outlet side of said filter element through said longitudinal slot and through said elongated opening whereby fluid is ejected through said filter element into said collector housing in a direction in reverse of normal flow through said filter element, and
   (i) a second longitudinal opening provided in said wall portion opening to the inlet side of said filter element whereby fluid is returned to the fluid system from said collector housing without loss of pressure.
2. The device as defined in claim 1 and including means for selectively adjusting the size of said slot.
3. The device as defined in claim 1 and including a baffle member carried by said common wall portion and extending into said collecting chamber in a position separating said openings.
4. A fluid filter device comprising
   (a) a collector housing and a filter housing overlying said collector housing and connected therewith by a common wall portion to form a closed filter chamber and a pressure sealed collecting chamber separated by said common wall portion,
   (b) a porous cylindrical filter screen carried in said filter chamber having its axis substantially parallel to said common wall portion and positioned closely adjacent thereto,
   (c) said filter housing having an inlet opening to said filter chamber exteriorly of said filter screen and an outlet opening to the interior of said filter screen,
   (d) means selectively operable to rotate said filter screen,
   (e) an ejector member carried in said filter housing and having a portion extending into the interior of said filter screen,
   (f) said ejector member being provided with a longitudinal slot extending substantially parallel to the axis of said cylindrical screen and positioned closely adjacent the inner peripheral wall thereof and closely adjacent said common wall portion,
   (g) an elongated opening provided in said common wall portion and a flanged member carried in said opening and having a pair of elongated opposite walls extending through said opening to a position closely adjacent the exterior surface of said cylindrical filter screen,
   (i) a baffle member carried by said common wall portion and extending between said walls and into said collecting chamber to form an elongated inlet slot closely adjacent and substantially parallel to said ejector member slot and an outlet slot positioned adjacent said inlet slot, and
   (j) means selectively operable to conduct fluid under pressure from the outlet side of said cylindrical filter screen through said ejector member slot and through said inlet slot into said collector chamber outlet opening.
5. The device as defined in claim 1 and in which said collector housing comprises,
   (a) a pair of opposite side walls and a pair of opposite end walls,
   (b) each of said walls having a lower portion inwardly inclined to form a reduced cross sectional bottom portion, and
   (c) a plate removably covering said bottom portion.

References Cited in the file of this patent

UNITED STATES PATENTS

| | | |
|---|---|---|
| 1,966,626 | Henry | July 17, 1934 |
| 2,834,474 | Jalkanen | May 13, 1958 |
| 3,074,560 | Kinney | Jan. 22, 1963 |